May 24, 1966 E. M. MILLER ETAL 3,252,668

SOUND TAPE CARTRIDGE AND APPARATUS

Filed June 10, 1963 3 Sheets-Sheet 1

INVENTORS.
JERRY O. KELLEY AND
EUGENE M. MILLER

BY [signature]

ATTORNEY.

May 24, 1966 E. M. MILLER ETAL 3,252,668

SOUND TAPE CARTRIDGE AND APPARATUS

Filed June 10, 1963 3 Sheets-Sheet 2

INVENTORS.
JERRY O. KELLEY AND
EUGENE M. MILLER
BY [signature]
ATTORNEY.

May 24, 1966 E. M. MILLER ETAL 3,252,668
SOUND TAPE CARTRIDGE AND APPARATUS
Filed June 10, 1963 3 Sheets-Sheet 3
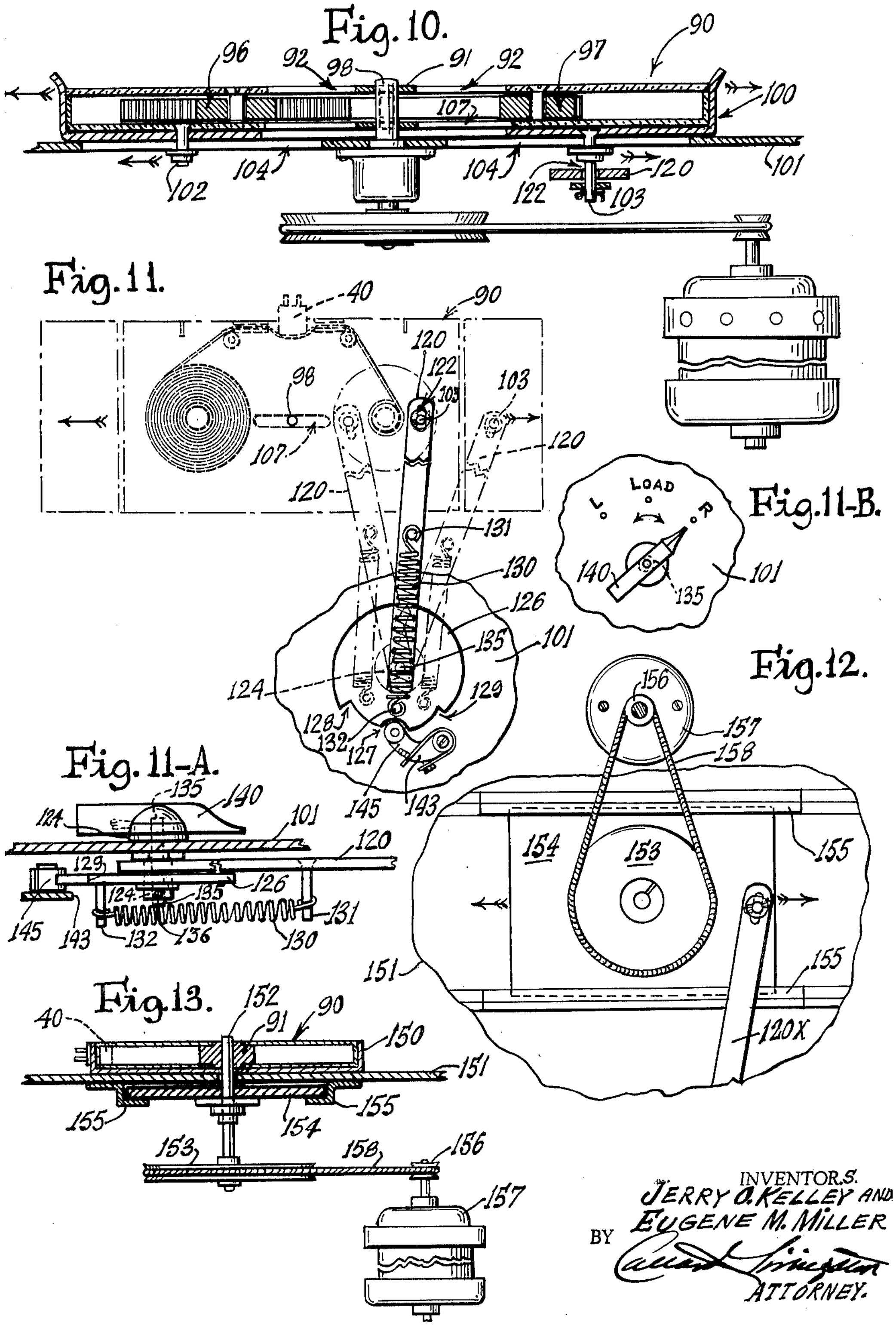
Fig. 10. Fig. 11. Fig. 11-A. Fig. 11-B. Fig. 12. Fig. 13.
INVENTORS.
JERRY O. KELLEY AND
EUGENE M. MILLER
BY
[signature]
ATTORNEY.

3,252,668

SOUND TAPE CARTRIDGE AND APPARATUS

Eugene M. Miller, Crystal Lake, and Jerry O. Kelley, Chicago, Ill., assignors, by mesne assignments, to Donald J. Moloney & Associates, Inc., Wilmette, Ill., a corporation of Illinois, and Catherine R. Moloney, Lake Forrest, Ill., as tenants in common Filed June 10, 1963, Ser. No. 286,635
10 Claims. (Cl. 242—55.13)

This invention pertains to sound-on-tape apparatus and more particularly to improvements in cartridge structures containing reel-to-reel tape winding means and special drive means acting directly on the wound tape to travel the same reversely between two reels by means of a capstan spindle driving the outermost turn of the tape cooperatively with an especially contrived drive shoe, such novel drive means being termed for convenience "rim" or "peripheral driving."

Some of the more detailed aspects of the disclosures pertain to the provisions of a miniature reel-to-reel tape cartridge and cooperative peripheral drive means especially suited to use in short-play portable types of sound equipment for demonstrations and sales purposes, and to use in amusement devices and toys, as well; and to the provision of larger long-play cartridges of the reel-to-reel type employing both dual and single drive shoe means for peripheral drive; and to the provision of cartridge carriers for seating and moving the several cartridges relative to corresponding peripheral-drive shoe and capstan means; and to the provision of a cartridge seating means and peripheral drive shoe means cooperable with a travelling capstan.

The foregoing and additional objects and aspects of novelty and utility inherent in the disclosed improvements will appear more fully as the following description proceeds in view of the annexed drawings, in which:

FIG. 10 is a vertical sectional detail of parts of another modified sound unit and cartridge carrier means adapted to employ the single captured-shoe type of cartridge depicted in FIG. 7;

FIG. 11 is a fragmental top plan view of the deck and parts of a sound unit employing the cartridge carrier and capstan means depicted in FIG. 10 with spring drive means for moving the carrier in opposite directions;

FIG. 11A is a sectional fragment of the spring drive mechanism depicted in FIG. 10 with parts shown in elevation;

FIG. 11B is a fragmentary top plan view of deck and selection control knob for FIGS. 11 and 11A;

FIG. 12 is a fragmental bottom plan view of parts of a sound unit adapted to employ the single captured shoe means of the cartridge of FIG. 7 with a modified capstan drive means in which the capstan travels and the cartridge is stationary;

FIG. 13 is a partial cross-sectional detail of parts of the capstan carrier means of FIG. 12.

Figures 1, 2, 3, 4, 5, 6:
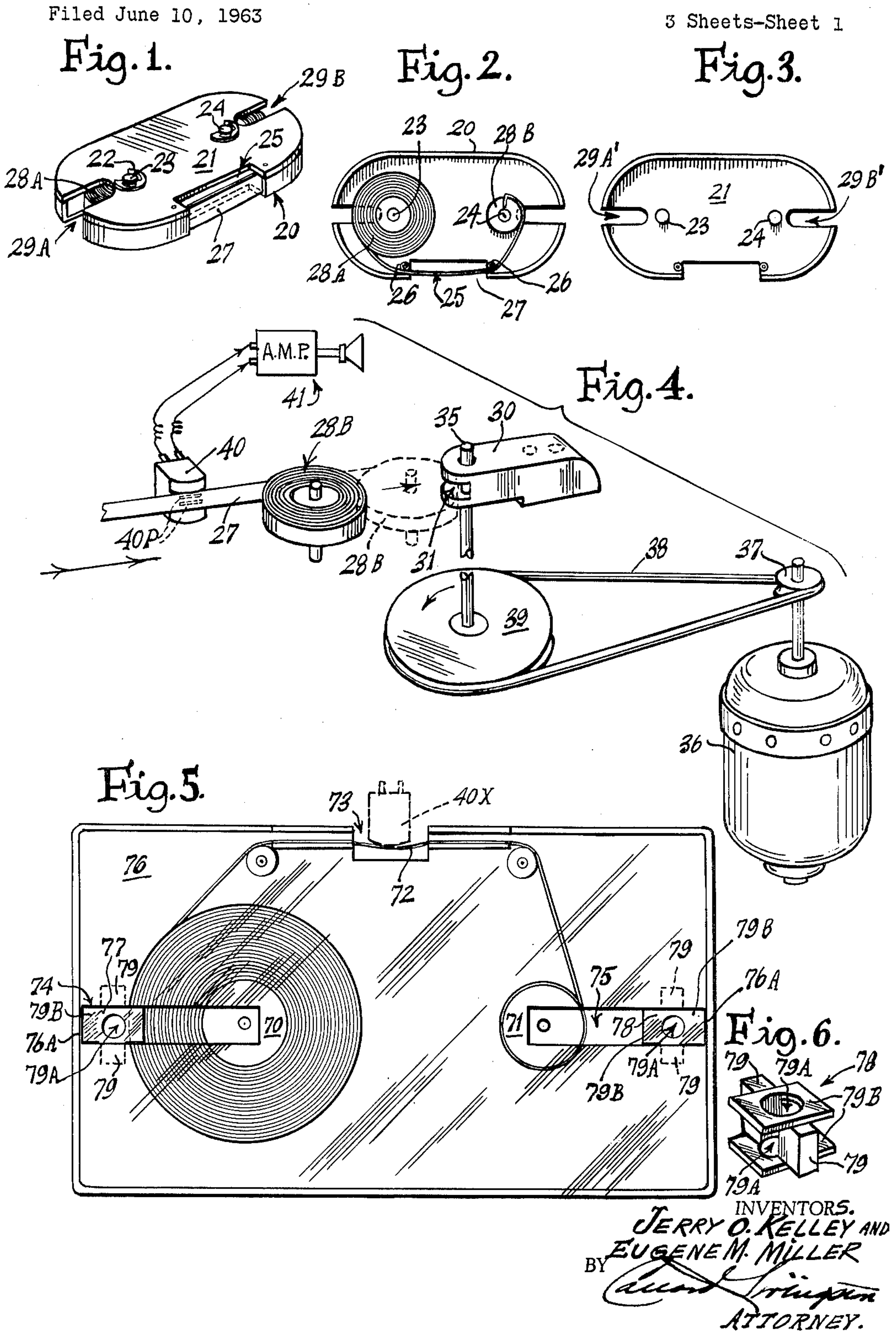
FIG. 1 is a perspective view of a miniature cartridge for use with a stationary drive shoe means.
FIG. 2 is a top plan view of the cartridge casing with cover removed.
FIG. 3 is a plan view of the inside of the cover plate for the casing of FIG. 2.
FIG. 4 is a perspective schematic of the operating components of a sound unit employing the cartridge of FIG. 1.
FIG. 5 is a top plan view of a modified long-play cartridge provided with dual, captured drive shoes.
FIG. 6 is an enlarged perspective detail of one of the drive shoes used in the device of FIG. 5.

The miniature cartridge shown in FIG. 1 provides a simple form of the rim-drive cartridge intended primarily for use in extremely compact portable sales-aid demonstrating units and the like, or amusement devices and toys requiring a short audio presentation of perhaps five to seven minutes duration, such cartridge consisting of a bottom casing section 20 (FIG. 2, also) and a cover plate 21 (FIG. 3) which may be secured in position by means such as the horse-shoe spring washers 22 engaging the slightly protruding ends of a pair of spool spindles 23 and 24 secured at their respective lower ends in the bottom wall of the casing which may be a molded plastic structure with integral spindles.

As viewed particularly in FIG. 2, the cartridge casing has a window web slot 25 in the mid-region of one of its side walls at the opposite ends of which are two guide pins 26 set in the bottom wall in spaced relation to the adjoining side walls or rim of the casing to define a guide passage for the transducing run of the web 27 of sound tape payed out from the full spool 28A for exposure to the usual type of sound head or transducer 40, as in FIG. 4.

Radially aligned with each of the spool spindles at the respectively opposite ends of the cartridge are drive shoe slots or tracks 29A, 29B, each formed to interfit with a drive shoe 30, such as depicted to larger scale in FIG. 4 (see also FIG. 8), the cover plate being provided with matching shoe slots $29A^1$, $29B^1$ (FIG. 3) so that the cartridge can be moved into interfit at either slot 29A, 29B with the shoe 30 and cause the outermost run or web of the tape wound thereon to be thrust against the capstan or drive spindle 35 (see FIGURE 8, also) which penetrates the notched or recessed end 31 of the shoe constituting a confining seat for contacting the driven portions of the tape with the capstan, and is of a dimension to admit a substantial number of turns of the tape winding affording a driving cushion for the spindle and also preventing bunching, and flattening out of the tape in a way which otherwise interferes with this type of rim or direct tape drive.

The capstan spindle 35 is driven at a slow transducing speed by a suitable motor and pulley means 36, 37, 38, 39, and when the cartridge is thrust as aforesaid into driving engagement with the shoe so that the latter is substantially at the limit of its location radially inward of the nearly empty spool 28B, the capstan spindle can bear against the outermost leading or starting turns of tape on the "empty" or starting spool 28B firmly enough to rotate the same to wind on the tape from the full spool, the web 27 being drawn past the window 25 in contact with the sound head 40 connecting with suitable audio amplifying and loudspeaker means 41. Preferably, the sound tape will have at least two reverse sound tracks so that when one track is played out in one direction the other track may be run through by simply withdrawing the cartridge from engagement with the drive shoe and reversing its position to engage the opposite slot and tape at the opposite end of the cartridge with the shoe.

Figures 8, 9, 9A:
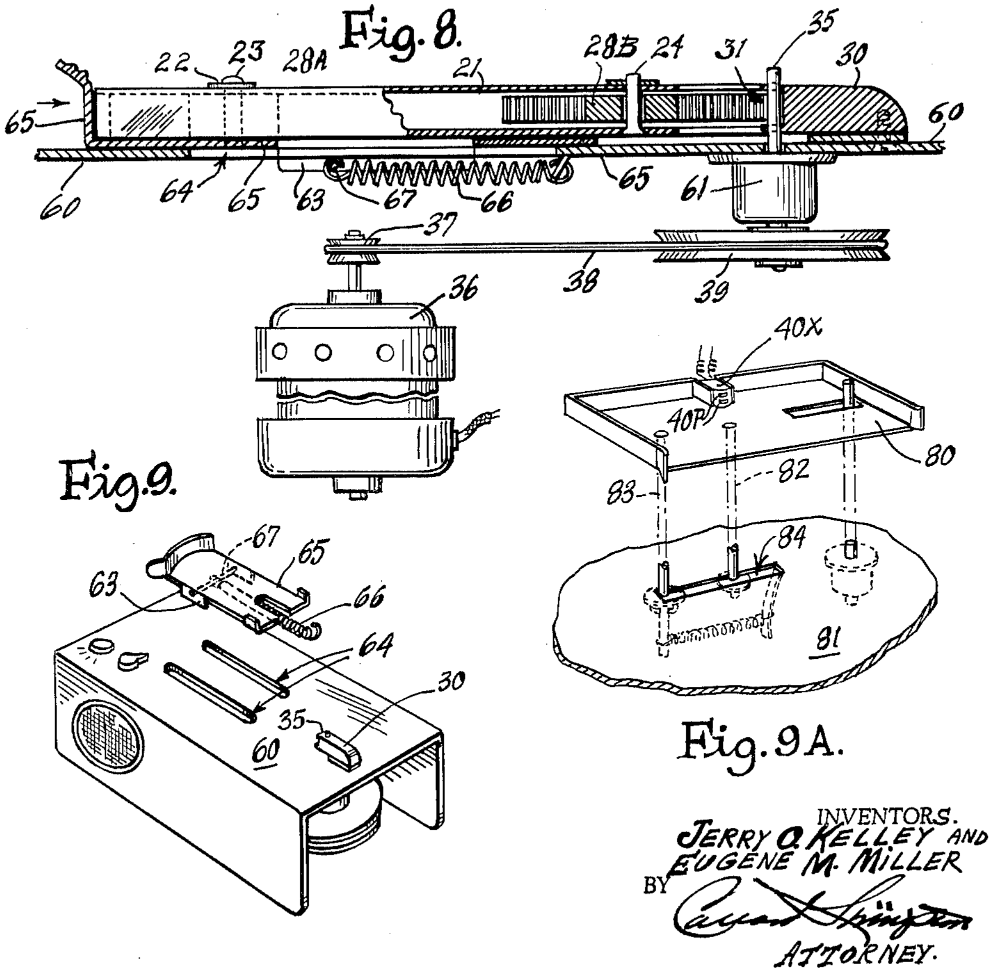
FIG. 8 is a vertical sectional detail of parts of a sound unit disclosing a type of carriage for the miniature cartridge of FIG. 1.
FIG. 9 is an exploded perspective of parts of a sound unit such as depicted in FIG. 8.
FIG. 9A is a fragmentary perspective schematic of a modified carriage adapted to receive the type of cartridge shown in FIG. 5.

Depicted in FIG. 8 is a fragmentary vertical sectional detail of a sound or message repeater unit comprising the deck 60 of a chassis to which is secured journal means 61 supporting the capstan spindle 35.

A cartridge carrier 65 is slidable on the top of the deck by means of spaced depending wings 63 working in deck slots 64, the carrier being urged to the right toward the capstan shoe and spindle 30, 35 by means of a spring 66 engaging a retaining pin 67 fixed in said wings. FIG. 9 illustrates the relative disposition of these parts.

The cartridge is dropped into the carrier seat when the latter is manually retracted from the shoe, and on release, the spring means will pull the carrier so as to thrust the cartridge and its drive or shoe slot into interfit and urge the empty spool against the capstan. Energization of the motor will reel-in the tape, and as the diameter of the winding grows the carrier will back off against the relatively yieldable action of the traction spring.

In the usual sound unit, the motor drive means is generally stopped automatically by some form of supervisory switch means, such as conductive clips or areas on the tape actuating a relay or other control means (not shown). When the end of one sound track is reached, the other track may be played by reversing the cartridge in the carrier and recycling the motor means.

A larger and modified form of rim-drive cartridge suitable for long-play cycling is shown in FIG. 5. This cartridge likewise contains a pair of tape spools 70, 71 between which the tape web 72 will be trained across the usual sound head 40X entering a slot 73 in the side of the cartridge.

At the two opposite ends of this cartridge are radial shoe slots 74, 75 formed both in the bottom wall of the case and in the top plate 76 thereof, with the difference in this embodiment that said shoe slots are not open-ended as in the device of FIG. 1, but are closed at as 76A, and two shoes 77, 78 of the special configuration shown in FIG. 6 are each respectively seated and captured in one of these closed end slots.

All forms of cartridge disclosed herein are preferably molded from plastic, although the miniature cartridge of FIG. 1 may for some applications be formed of metal. Accordingly, at least the top plate 76 will preferably be transparent so as to display the tape spools and distribution of the tape thereon.

The captured drive shoes 77, 78 are identical and also preferably molded of plastic in the form depicted in FIG. 6 so as to include a pair of laterally opposite gliding wings or runners 79 flanking a central hole 79A adapted to receive the capstan spindle, there being integral upper and lower longitudinal plate portions 79B fitting into the slots in the cover plates while the side wings or runners 79 glide on the bottom wall portions of the casing and beneath the cover plate at the bordering margins of the shoe slots.

Like the miniature cartridge of FIG. 1, the long-play cartridge of FIG. 5 with dual captured shoes must be manually and selectively reversed to run off the tape in opposite directions and play both sound tracks, and to this end will be used in a sound unit, according to FIG. 9A, having a cartridge carrier 80 glidingly seated on the top deck 81 of a chassis by means such as a pair of spaced guide pins 82, 83 depending from the bottom of the carrier through slot 84 in the deck.

Preferably, also, the sound head or transducer 40X in the device of FIG. 9A will be mounted on the carrier to move therewith, it being understood that such a head will have the usual upper and lower sensing poles 40P (as in FIG. 4) or optionally two single heads may be employed (not shown )in a manner known in the art.

Figure 7:
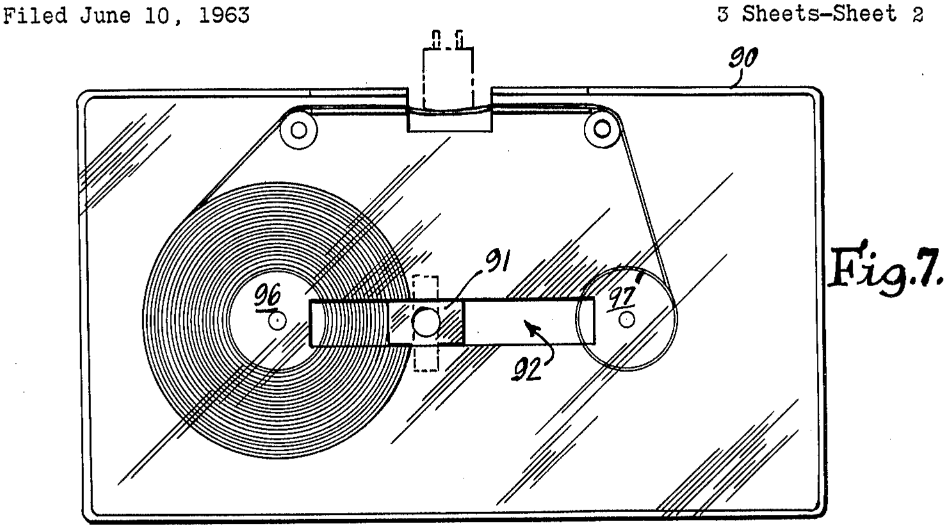
FIG. 7 is a top plan view of another modified long-play cartridge employing only one captured drive shoe capable of reverse operation.

A further cartridge modification, according to FIG. 7, discloses a long-play cartridge 90 employing a single, captured, drive shoe 91 movable in opposite directions working in a central slot 92 between the two reels 96, 97 in the cartridge, this shoe also being of the form shown in FIG. 6, so that the principal difference between the cartridge of FIG. 5 with dual, captured shoes, and the cartridge of FIG. 7 resides in the fact that the latter has only one drive shoe working for reverse travel in only one long central shoe slot 92 extending lengthwise between the two reeling or spool spindles 96, 97 in radial alignment with the rotative axes of the latter and a centrally-located capstan spindle 98, such as shown in FIG. 10.

The cartridge 90 with single, central, captured shoe is used in a carrier 100 movable in opposite directions from a central or neutral starting position, as depicted in FIGS. 10 and 11, wherein the carrier is retained and guided upon the chassis deck plate 101 by retaining means including pins 102, 103, depending therefrom through slots 104 in the deck, while the stationary capstan spindle 98 projects upwardly through a long central slot 107 in the carrier and through the central shoe 91.

The oppositely-travelling carrier 100 may be driven by any suitable means, such as the drive lever 120, seen in FIG. 10 and in bottom plan in relation to a fragmentary phantom view of the carrier depicted in FIG. 11.

The lever 120 is provided with an over-center spring means manually set to urge the carrier selectively in either of its opposite directions of travel.

At one end the lever 120 has a long slot 122 freely receiving one of the carrier pins 103, the opposite end of this lever being pivoted on a bushing post 124 concentrically with a selector cam 126 having a central neutral slot 127 and a pair of opposite stop shoulders 128, 129 angularly displaced from the central slot. A traction spring 130 is anchored at one end on a pin 132 on the cam and at its opposite end on another pin 131 on the lever 120. A shaft 135 (FIG. 11A) concentric with the lever and cam in the bushing, serves as a selector shaft and is keyed at 136 to the hub of the cam only, and extends above the deck into fixed engagement with a three-position selector knob 140 movable optionally into the left or L and right or R position from a central or neutral loading position. Thus, the cam and knob are fixed to move with the shaft, while the lever 120 floats free on the bushing 124, and is urged to right or left by the spring where the cam is tripped out of the central or neutral loading position (FIG. 11B).

When the knob 140 is in central or loading position, the carrier 100 is centered symmetrically relative to the capstan spindle and the shoe will be free of both spools and the tape, so that the cartridge may be lifted free from the capstan and carrier. But when the knob 140 is turned to either the L or R drive positions (FIG. 11B), the cam will be stopped accordingly against one or the other of the shoulders 128, 129 by a spring loaded pawl means 143–145, and the over-center spring 130 will then urge the lever 120 to drive the carrier accordingly.

In FIGS. 12 and 13 there is shown a modified arrangement of the capstan drive adapted for use with the cartridge of FIG. 7 according to which the cartridge 90 is held in a seat 150 which is stationary on a deck 151, while the capstan spindle 152 is shiftable by reason of being carried on a slide-plate 154 supported on tracks 155 beneath the deck for movement in opposite directions from a central or neutral position in which the captured cartridge shoe 91 is effectively free of both the spool and the tape.

Means for driving the shiftable capstan mechanism may include the same type of over-center spring and shift lever mechanism depicted in FIGS. 11, 11A, the lever 120X of FIG. 12 being the counterpart of lever 120 in FIG. 11 and being shifted by the same kind of over-center spring, cam and detent means (not repeated in FIG. 12) to drive the spindle slide plate or carriage 154 from a neutral, centralized loading position for right or left excursions. However, the driving connection between the capstan pulley 153 and the pulley 156 of the motor 157 is yieldable and may take the form of a spring belt 158 affording an adequate range of permissible movement to the right or left from a median location of the motor 157 aligned opposite the central or neutral position of the capstan spindle, as in FIGS. 12 and 13.

We claim:

1. In sound tape mechanism, a drive shoe including a member having a recessed end portion of a dimension to fit over a portion of the rim of a rotatable winding of tape to closely embrace a plurality of turns thereof in confinement relative to a driving spindle; a driving spindle projecting into said recessed end portion of the shoe and having peripheral drive portions exposed in a position to engage the peripheral portions of the outermost one of said turns of tape embraced by the recessed end portion as aforesaid, whereby said winding of tape may be rotated responsive to rotation of the driving spindle and urgence of the shoe and winding one toward the other to cause a predetermined driving engagement between the confronting portions of the spindle and tape in said recessed end portion of the shoe.

2. Means for winding tape about a spindle comprising a drive shoe having an end portion provided with a tape slot which is of a dimension to fit closely over the rim of the tape winding so as to enclose a plurality of turns of the tape web on the top and bottom sides of the winding; spindle means for a winding spool; and means mounting said spindle means and said shoe for relative movement of one with respect to the other with said tape slot confronting the spindle in radial alignment with the spindle axis for entry or withdrawal of the rim portion of the tape windings from said tape slot; a driven capstan spindle having portions adapted to enter said shoe in juxtaposition with said tape slot, said slot being formed to expose a peripheral driving portion of the capstan spindle to the outermost web of the tape winding received therein for driving engagement therewith; and means operable to provide a yieldable effort acting to press the enclosed turns of tape into said slot with the outermost turn thereof urged into driving engagement with said capstan.

3. Sound tape apparatus including a tape cartridge comprising a closed receptacle having opposite end portions and intervening side wall portions with a pair of interiorly-situated, parallel tape-spooling spindles each respectively disposed opposite one of said end portions, one of said side wall portions having an opening constituting a transducing window past which a web of sound tape is to be travelled in moving from one of said spindles to another; each of said end portions of the cartridge receptacle being provided with an elongated shoe slot opening through the margins thereof and respectively extending inwardly in radial alignment with the proximate one of said spindles; tape spool means rotatable on each spindle; means for peripherally driving a winding of tape from the spool means on either spindle to the other and including a drive shoe having an elongated body portion closely but freely interfitting with either of said shoe slots for movement into and out thereof and having a driving end portion adapted to enter said slots foremost for advance toward the appertaining spindle and spool means thereon; said end portion having a cut-out formation into which a plurality of turns of tape carried on either said spool means will be received and closely embraced by said cut-out formation but freely rotatable therein responsive to corresponding movement of the appertaining spool means; a driven capstan spindle projecting into said cut-out formation of the shoe for rotation about an axis paralleling that of the spooling spindles, said capstan spindle having a peripheral drive portion exposed in said cut-out formation for driving engagement with peripheral portions of the outermost one of the turns of tape received therein as aforesaid; and means for releasably engaging and urging said cartridge toward said shoe into drive-slot interfit therewith and driving engagement of the capstan with the tape as aforesaid whereby to wind tape from one to another of the spindles as aforesaid responsive to rotation of the capstan spindle.

4. In sound tape apparatus, a tape cartridge including a pair of spaced parallel tape spindles respectively adapted to receive for rotation thereabout a winding of tape, the web of which is travelled from one spindle to another, said cartridge having a window past which said web moves for exposure to transducing means; a drive shoe comprising a member having a passage to receive a tape-driving capstan spindle and further tape-engaging formations adapted to embrace a portion of tape winding including a plurality of concentric turns of the winding so disposed relative to the capstan passage as to expose the outermost one of said tape turns to the rotatable periphery of the capstan spindle in driving relation to the latter, thereby tending to rotate the entire tape winding responsive to rotation of said capstan spindle; means formed as a part of said cartridge to receive and guide said shoe in a path of movement radial to that one of said tape windings with which it is engaged as aforesaid; means defining a supporting seat for said cartridge; means supporting a driven capstan spindle relative to said seat for engagement of the said spindle in said passage in the shoe by placement of the cartridge in said seat; means for driving the capstan spindle, and means operative to yielding urge the capstan spindle and cartridge, one with respect to the other, in a direction radial of the respective spindle axes, whereby to create a driving interengagement between the said outermost turn of embraced tape and the capstan spindle to rotate the appertaining winding and travel the tape web as aforesaid; and means supporting a transducer relative to said window for transducing cooperation with the travelled tape web.

5. Apparatus as set forth in claim 4 further characterized in that said cartridge seat is movable in radial alignment with said capstan spindle, and said surging means acts upon said seat to yieldingly urge the same in a direction toward the capstan spindle.

6. Apparatus as set forth in claim 4 further characterized in that said cartridge seat is fixed in relation to said capstan spindle and the capstan spindle is carried by a shiftable means movable along a linear path radial to the tape spindle axes, and said urging means is selectively operative to yieldingly urge said shiftable capstan carrying means in opposite directions along said path from a central position while said capstan spindle is in operative engagement with the drive shoe as aforesaid.

7. A sound tape cartridge having a pair of parallel tape winding spindles spaced apart therein and respectively adapted to receive thereon for rotation thereabout a tape winding; means comprising part of said cartridge defining a guide slot aligned radially with respect to said spindles and adapted to receive a drive shoe for movement toward or away from either winding spindle; a movable drive shoe comprising a member having parts slidably fitting into and captured in said guide slot and confining the movement of the shoe to reciprocatory travel radially relative to said spindles, said shoe having a formation defining a spindle passage to receive a capstan spindle in a position with its rotative axis parallel and in radial alignment with said winding spindles in all positions of travel of the shoe, relative shifting movement between the cartridge and shoe, one toward the other, in the direction of travel of the shoe serving to urge the capstan spindle into driving engagement with the outermost turn of the corresponding tape winding to cause rotation of the latter; said shoe having a tape-confining formation immediately adjoining that part of the capstan spindle which is to be in driving contact with the tape winding and adapted to receive and confine a plurality of concentric turns of the tape winding which are immediately proximate to that part of the outermost turn of the winding which is in driving engagement with the capstan spindle, whereby to maintain a predetermined driving engagement between the capstan spindle and driven portion of the tape winding.

8. Sound tape apparatus comprising a cartridge casing, means in said casing providing parallel spooling axes for a web of sound tape, a capstan shoe having a spindle passage located between certain opposite sides thereof to receive a tape-driving capstan spindle rotatable about an axis parallel to said spooling axes, means guidedly supporting said shoe in said casing for movement back and forth in between said spooling axes along a line substantially radial to both axes and permitting an approach into predetermined proximity to either spooling axis for pressing engagement of the shoe with the outer surface of a tape web disposed to be wound about said axes, said shoe having a recessed tape web receiving formation on each of said certain opposite sides thereof with said recessed formations communicating respectively into said spindle passage to expose substantial peripheral driving surface portions of a capstan spindle inserted therein such that a pressing engagement between the shoe and a tape winding entered into one of said recessed shoe formations, and in a direction toward the axis appertaining to the tape winding thus engaged, will cause such tape to be travelled and wound relative to such axis responsive to rotation of said capstan spindle.

9. In sound tape apparatus, a drive shoe including a member having a slot dimensioned to fit over the rim and adjoining top and bottom sides of rolled sound tape of predetermined maximum diameter so as to embrace numerous turns of the winding and confine the embraced portions against dislodgement and escape from the driving effort and contact of a driving spindle with the outermost turn of the winding, said slotted portion of the shoe having a driving spindle disposed therein for engagement with the outermost turn of the winding of tape engaged by the shoe as aforesaid; and means for supporting tape for winding into a roll and entry of rim portions of the roll into the slotted portion of the shoe as aforesaid, together with means for producing relative urgence of the roll of tape and the shoe to maintain driving engagement between the spindle and outermost turn of the tape as aforesaid.

10. Apparatus according to claim 9 further characterized in that said shoe is carried in combination with said tape supporting means, and said driving spindle is carried by a separate means, and said shoe is provided with passage means communicating with said slot and adapted to receive said spindle for entry or removal by corresponding engaging and disengaging manipulation of said supporting means and spindle, one with respect to the other, for such purposes.

References Cited by the Examiner

UNITED STATES PATENTS 2,615,989 10/1952 Thad ---------- 242—55.12 X
2,919,866 1/1960 Minott ----------- 242—55.11

MERVIN STEIN, *Primary Examiner.*

L. D. CHRISTIAN, *Assistant Examiner.*